(12) United States Patent
Lu et al.

(10) Patent No.: US 11,121,627 B2
(45) Date of Patent: Sep. 14, 2021

(54) DC/DC CONVERSION SYSTEM

(71) Applicant: Delta Electronics, Inc., Taoyuan (CN)

(72) Inventors: Shengli Lu, Taoyuan (CN); Wenhua Li, Taoyuan (CN)

(73) Assignee: Delta Electronics, Inc., Taoyuan (CN)

( * ) Notice: Subject to any disclaimer, the term of this patent is extended or adjusted under 35 U.S.C. 154(b) by 9 days.

(21) Appl. No.: 16/745,402

(22) Filed: Jan. 17, 2020

(65) Prior Publication Data
US 2020/0251985 A1  Aug. 6, 2020

(30) Foreign Application Priority Data

Feb. 3, 2019  (CN) .......................... 201910108715.1

(51) Int. Cl.
*H02M 3/156* (2006.01)
*H02M 3/335* (2006.01)
*H02M 1/10* (2006.01)

(52) U.S. Cl.
CPC ............. *H02M 3/156* (2013.01); *H02M 1/10* (2013.01); *H02M 3/335* (2013.01)

(58) Field of Classification Search
None
See application file for complete search history.

(56) References Cited

U.S. PATENT DOCUMENTS

| 9,893,633 | B1 | 2/2018 | Li et al. | |
| 2005/0254272 | A1 | 11/2005 | Vinciarelli | |
| 2007/0086224 | A1* | 4/2007 | Phadke | H02M 3/285 363/65 |
| 2014/0268889 | A1* | 9/2014 | Scott | H02M 3/285 363/15 |
| 2018/0063932 | A1* | 3/2018 | Leibl | H02M 3/33569 |
| 2018/0358901 | A1* | 12/2018 | Lu | H05K 1/181 |

FOREIGN PATENT DOCUMENTS

| CN | 102064707 A | 5/2011 |
| CN | 102158095 A | 8/2011 |
| CN | 102545628 A | 7/2012 |
| CN | 102611291 A | 7/2012 |

(Continued)

OTHER PUBLICATIONS

The 1st Office Action dated Mar. 3, 2021 by the CNIPA from application No. 2019101087151.
The TW1OA issued Nov. 3, 2020 by the TW Office.

*Primary Examiner* — Jeffrey A Gblende
(74) *Attorney, Agent, or Firm* — Qinghong Xu

(57) ABSTRACT

The present disclosure relates to a DC/DC conversion system, including a plurality of switch conversion branches, each of the switch conversion branches includes: a primary side circuit, having an input end connected in parallel with an input capacitor; a transformer, having a primary winding coupled to the primary side circuit; and a secondary side circuit, coupled to a secondary winding of the transformer, wherein, input ends of the primary side circuits of the plurality of switch conversion branches are connected in series to form a system input end, output ends of the secondary side circuits of the plurality of switch conversion branches are connected in series to form a system output end, and a filter circuit is connected in parallel with the system output end.

17 Claims, 17 Drawing Sheets

(56) References Cited

FOREIGN PATENT DOCUMENTS

| | | |
|---|---|---|
| CN | 102638164 A | 8/2012 |
| CN | 102158095 B | 8/2013 |
| CN | 102723870 B | 7/2015 |
| CN | 205092776 U | 3/2016 |
| CN | 105553271 A | 5/2016 |
| CN | 105958828 A | 9/2016 |
| CN | 106712523 A | 5/2017 |
| CN | 206517298 U | 9/2017 |
| CN | 206807300 U | 12/2017 |
| CN | 208001236 U | 10/2018 |
| CN | 109039079 A | 12/2018 |
| TW | 201406030 A | 2/2014 |

* cited by examiner

DC/DC CONVERSION SYSTEM

CROSS REFERENCE

The present application claims priority to Chinese Patent Application No. 201910108715.1, filed on Feb. 3, 2019, the entire contents of which are hereby incorporated by reference.

TECHNICAL FIELD

The present disclosure relates to the field of power supply technology, and in particular, to a small-sized DC (Direct Current)/DC conversion system capable of providing high power.

BACKGROUND

On-board DC/DC power modules are widely used in telephone communication, data centers, supercomputers and other fields. With the rapid development of fixed network and mobile communications, the requirements for output power and efficiency of on-board DC/DC power modules are getting higher and higher. In order to improve the efficiency, the input bus voltage transitions from the original 48V to a higher voltage such as 380V or even 800V. In order to increase the output power, parallel switching devices or parallel switching converters are frequently used in related art. When the input voltage is as high as 800V, the existing components cannot meet the requirements or the cost is very high, so the above method will no longer be applicable.

It should be noted that the information disclosed in the background section above is only used to enhance the understanding of the background of the disclosure, and therefore may include information that does not constitute the prior art known to those of ordinary skill in the art.

SUMMARY

The present disclosure is directed to provide a DC/DC conversion system.

According to an aspect of the disclosure, there is provided a DC/DC conversion system, including: a plurality of switch conversion branches, each of the switch conversion branches includes: a primary side circuit, having an input end connected in parallel with an input capacitor; a transformer, having a primary winding coupled to the primary side circuit; and a secondary side circuit, coupled to a secondary winding of the transformer, wherein, input ends of the primary side circuits of the plurality of switch conversion branches are connected in series to form a system input end, output ends of the secondary side circuits of the plurality of switch conversion branches are connected in series to form a system output end, and a filter circuit is connected in parallel with the system output end.

It should be understood that the above general description and the following detailed description are merely exemplary and explanatory, and should not limit the present disclosure.

BRIEF DESCRIPTION OF THE DRAWINGS

The accompanying drawings herein are incorporated in and constitute a part of this specification, illustrate embodiments conforming to the present disclosure and together with the description serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
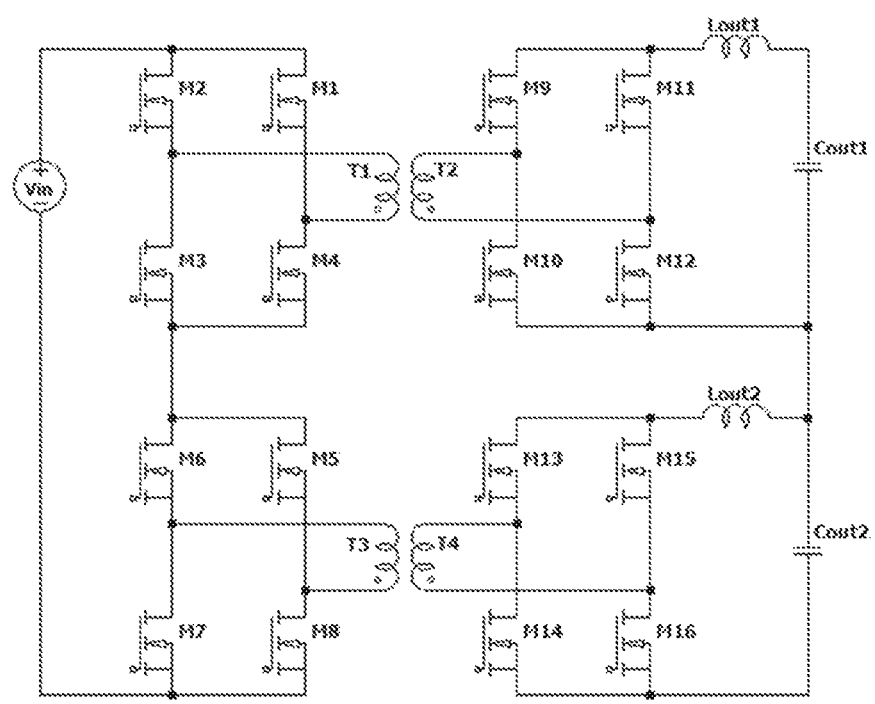
FIG. 1 is a schematic diagram illustrating a DC/DC conversion system in related art where the primary side inputs are connected in series and the secondary side outputs are connected in series.

Exemplary embodiments will be described more comprehensively by referring to accompanying drawings now. However, the exemplary embodiments can be embodied in many forms and should not be construed as limited to the embodiments set forth herein; rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

Furthermore, the accompanying drawings are merely schematic illustrations of the present disclosure. Same or similar parts are denoted by same reference numbers in the drawings and, thus, a detailed description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

FIG. 1 illustrates a DC/DC conversion system in which the primary side inputs of each switch conversion branch are connected in series and the secondary side outputs thereof are connected in series. In this system, the output inductor Lout1 and the output capacitor Cout1 constitute a filter circuit, and the output inductor Lout2 and the output capacitor Cout2 constitute another filter circuit. The filter parameters of these two filter circuits are large, resulting in a large volume of magnetic components. The output power as thus achieved may be relatively great, but the circuit is large and costly.

Figure 2:
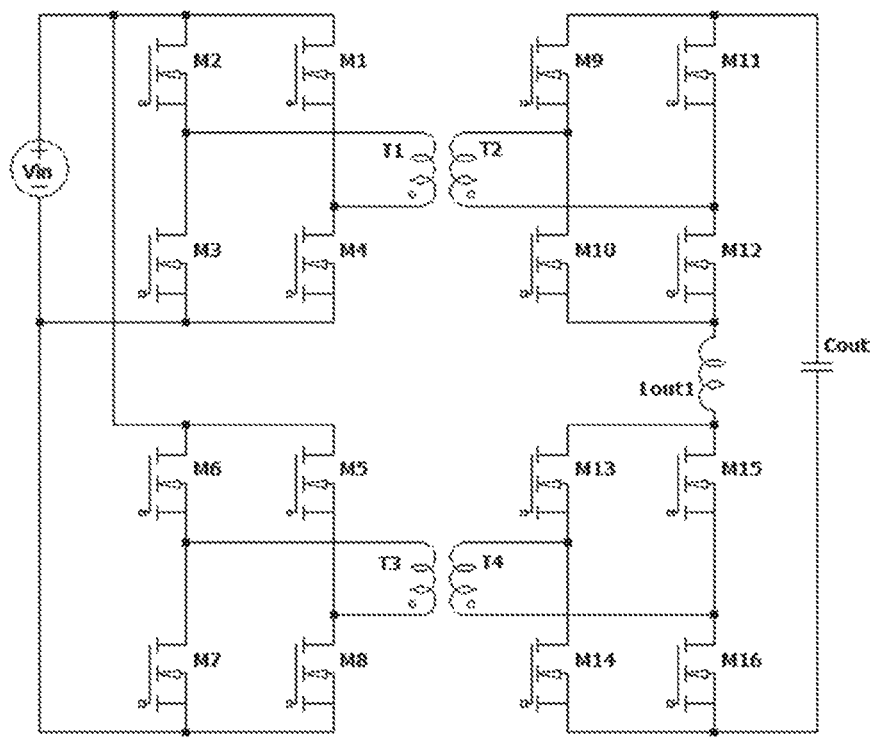
FIG. 2 is a schematic diagram illustrating a DC/DC conversion system in related art where the primary side inputs are connected in parallel and the secondary side outputs are connected in series.

FIG. 2 illustrates a DC/DC conversion system in which the primary side inputs of each switch conversion branch are connected in parallel and the secondary side outputs thereof are connected in series. The phase difference between the driving signal of the corresponding switch is 90 degrees. This solution can solve the problem of FIG. 1 where the filtering circuit parameters are large and, thus, the volume of filter magnetic components is large. However, for those high input voltage applications, switching devices with high withstand voltage need to be selected. Such switching devices with high withstand voltage are costly and are not the optimal choice in terms of cost.

Therefore, there is a need for a DC/DC conversion system that meets requirements of high voltage input, high power output, small size, and low cost.

The present disclosure is directed to provide a DC/DC conversion system, so as overcome the problems of the DC/DC conversion system, caused by the limitations and defects in related art, which is difficult to enable the implementation of large output power, low cost high voltage input and small size.

A detailed description of the exemplary embodiments of the present disclosure will be made in the following with reference to the accompanying drawings.

Figure 3:
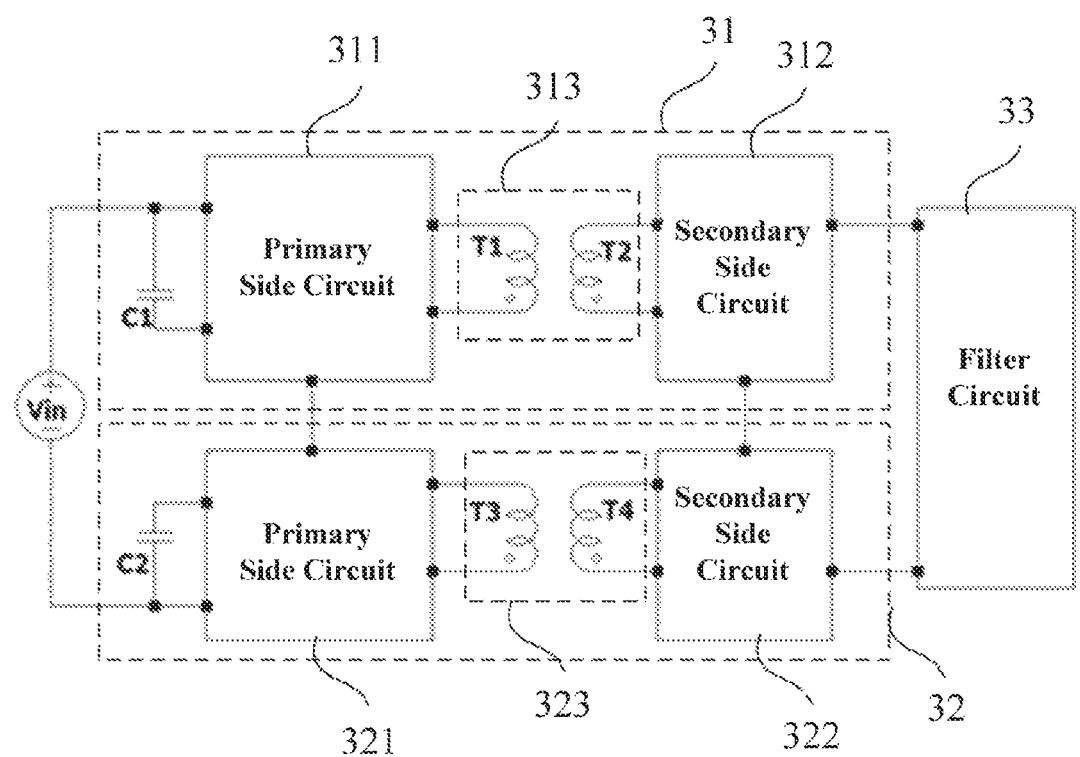
FIG. 3 is a schematic diagram illustrating a DC/DC conversion system according to the disclosure.

FIG. 3 is a schematic diagram illustrating a DC/DC conversion system according to the disclosure. As shown in FIG. 3, the DC/DC conversion system includes multiple switch conversion branches. Taking a DC/DC conversion system 300 including two switch conversion branches as an example, the first switch conversion branch 31 includes:

a primary side circuit 311, having an input end connected in parallel with an input capacitor C1;

a transformer 313, having a primary winding coupled to the primary side circuit 311; and a secondary side circuit 312, coupled to a secondary winding of the transformer 313.

The second switch conversion branch 32 also includes:

a primary side circuit 321, having an input end connected in parallel with an input capacitor C2;

a transformer 323, having a primary winding coupled to the primary side circuit 321; and a secondary side circuit 322, coupled to a secondary winding of the transformer 323.

In an embodiment, input ends of the primary side circuits of the multiple switch conversion branches are connected in series to form a system input end, output ends of the secondary side circuits of the multiple switch conversion branches are connected in series to form a system output end, and a filter circuit 33 is connected in parallel with the system output end. It should be noted that FIG. 3 is merely an example, and the present disclosure does not limit the number of switch conversion branches or the type of the switch conversion branches. The switches in the switch conversion branch may be implemented by bipolar junction transistor (BJT), metal-oxide semiconductor field-effect transistor (MOSFET) or other appropriate semiconductors.

The DC/DC conversion system provided by some embodiments of the present disclosure can be applied to high-voltage input and high-power output scenarios by connecting the input ends of the switch conversion branches in series, connecting the output ends thereof in series and using only one output filter circuit, which lowers requirements of components and the transformer, reduces the size of the transformer and reduces EMI interference.

Figure 4:
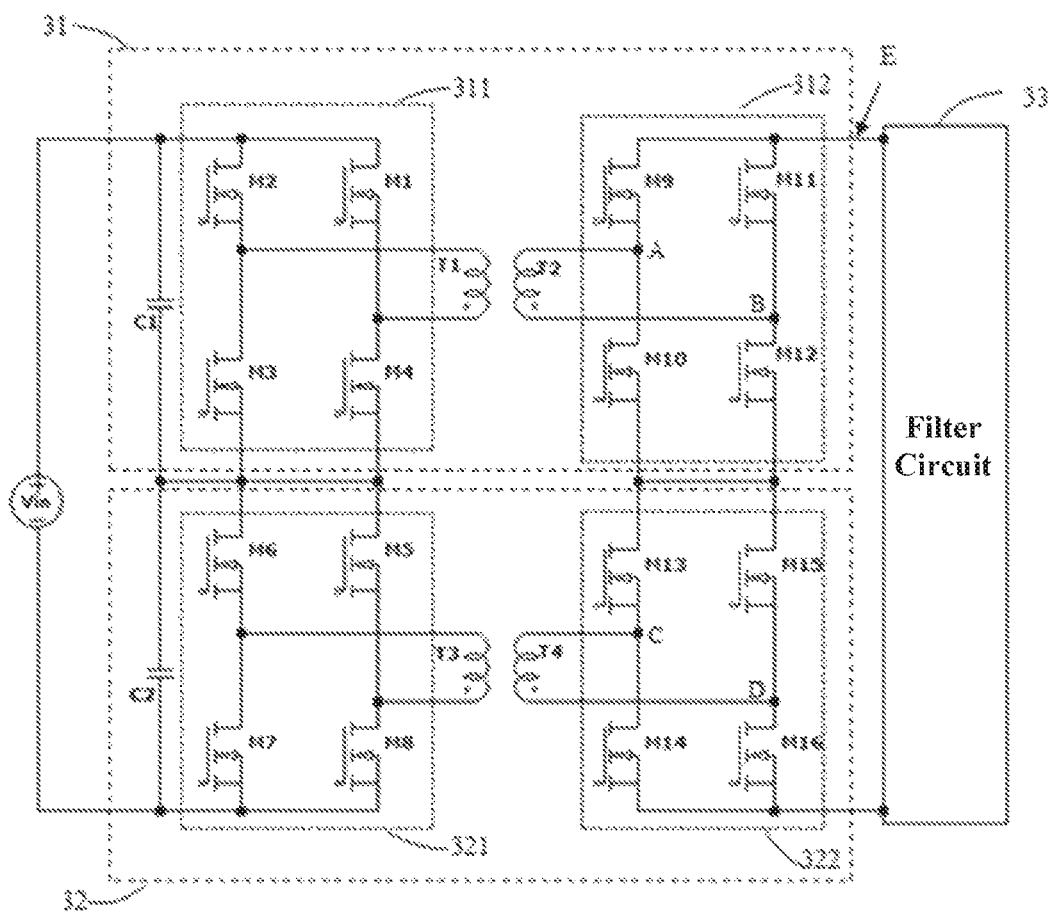
FIG. 4 is a schematic diagram according to a first embodiment of the disclosure.

FIG. 4 illustrates an embodiment of the DC/DC conversion system shown in FIG. 3.

Referring to FIG. 4, in the embodiment shown in FIG. 4, two switch conversion branches 31 and 32 are connected in series at both the primary and secondary sides. The input end of the primary side circuit 311 of the first branch 31 is connected in parallel with the input capacitor C1, and the input end of the primary side circuit 321 of the second branch 32 is connected in parallel with the input capacitor C2. The input capacitor C1 and the input capacitor C2 are connected in series to form the input end of the DC/DC conversion system, which is coupled to the input voltage Vin. The output end of the secondary side circuit 312 of the first branch 31 is connected in series with the output end of the secondary side circuit 322 of the second branch 32 to form the system output end of the DC/DC conversion system. The output filter circuit 33 is connected in parallel with the system output end.

In the embodiment shown in FIG. 4, the primary side circuits 311 and 321 are full-bridge circuits. Each full-bridge circuit includes two bridge arms, and each bridge arm includes two coupled switches. The phase difference between the driving signals of the switches at the corresponding positions of the two branches 31 and 32 is 90 degrees.

Figure 5:
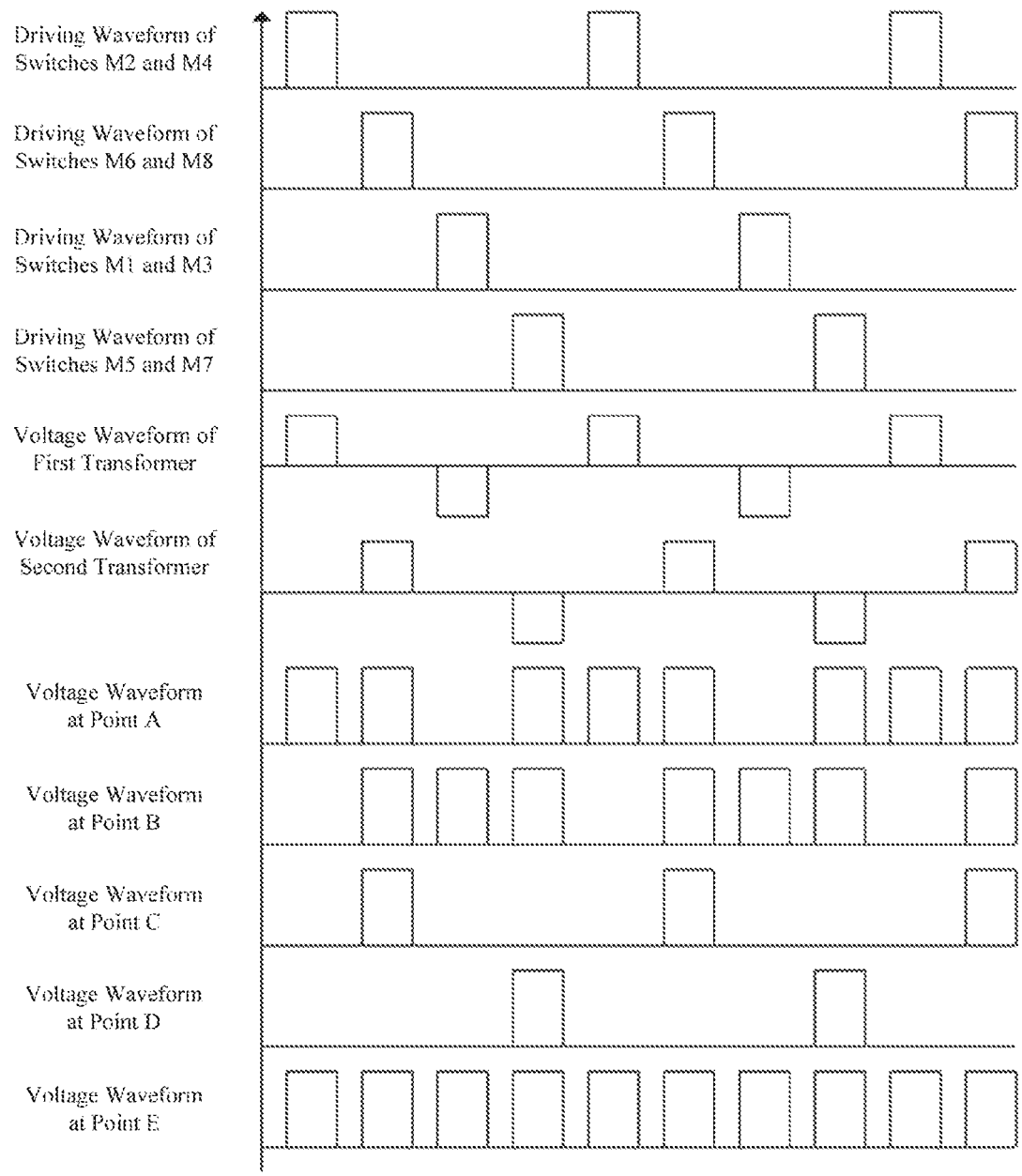
FIG. 5 illustrates a control timing chart of the embodiment shown in FIG. 4.

FIG. 5 illustrates a control timing chart of the embodiment shown in FIG. 4.

Referring to FIG. 5, taking the duty ratio D<0.25 as an example, in the first branch 31, the driving signals of the switches M2 and M4 have the same phase, the driving signals of the switches M1 and M3 have the same phase, and the phase difference between the driving signals of the switches M1 and M2 is 180 deg. In the second branch 32, the driving signals of switches M6 and M8 have the same phase, the driving signals of switches M5 and M7 have the same phase, the phase difference between the driving signals of the switches M5 and M6 is 180 deg, and the phase difference between the driving signals of the switches M2 and M6 is 90 deg.

Point E corresponds to the voltage waveform at the input end of the filter circuit, which is a pulse voltage with a relatively high frequency. The frequency of the pulse voltage at point E is twice the frequency of a single branch. Compared with the DC/DC conversion system shown in FIG. 1, the technical solution of this embodiment not only reduces the original two filter circuits to one, but also greatly reduces the size of the one filter.

On the other hand, compared with the DC/DC conversion system shown in FIG. 2, under the same input voltage and the same output voltage, since the input ends of the primary side circuits of the two branches are connected in series in this embodiment, the rated voltages of the switches M1-M8 in the primary side circuit and the input capacitors C1-C2 can be reduced to ½ or even lower than the rated voltages of the corresponding switches and capacitors in FIG. 2. Accordingly, the conduction resistance of the switches as well as the drain-source voltage thereof may be decreased, so the efficiency of the converter can be improved, the EMI of the converter can be decreased, and the cost of components can be lowered. Moreover, as the input ends of the primary side circuits are connected in series, the input voltage of the primary side circuit of each branch may be decreased, so the voltage difference between the primary and secondary sides is reduced, the voltage difference between the transformer windings is reduced, the leakage inductance is reduced, and the corresponding safety distance can be reduced, facilitating the design and manufacture and, especially in high-voltage applications, greatly reducing the size of the transformer.

Figure 6:
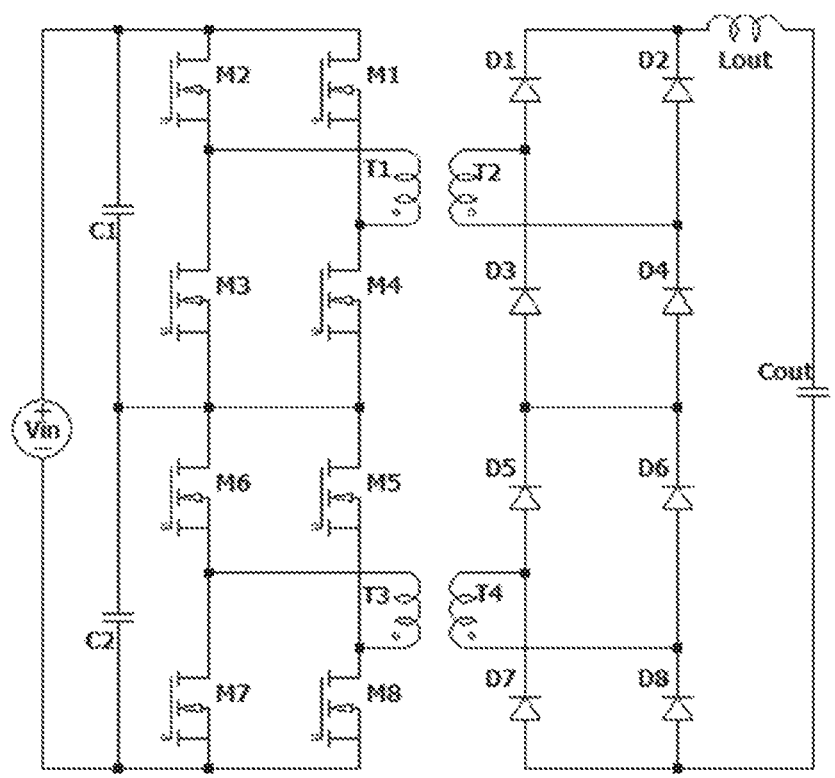
FIG. 6 is a schematic diagram according to a second embodiment of the disclosure.

It should be noted that the present disclosure does not limit the circuit topology of the secondary side circuit of the branch. FIG. 6 is a schematic diagram according to a second embodiment of the present disclosure. In FIG. 6, the secondary side circuit of each branch may include a bridge arm composed of a diode. The switch control method for the primary side circuit shown in FIG. 5 may also be applied to the circuit topology where the secondary side circuits of one or more branches include diodes, which is not repeated herein.

Figure 7:
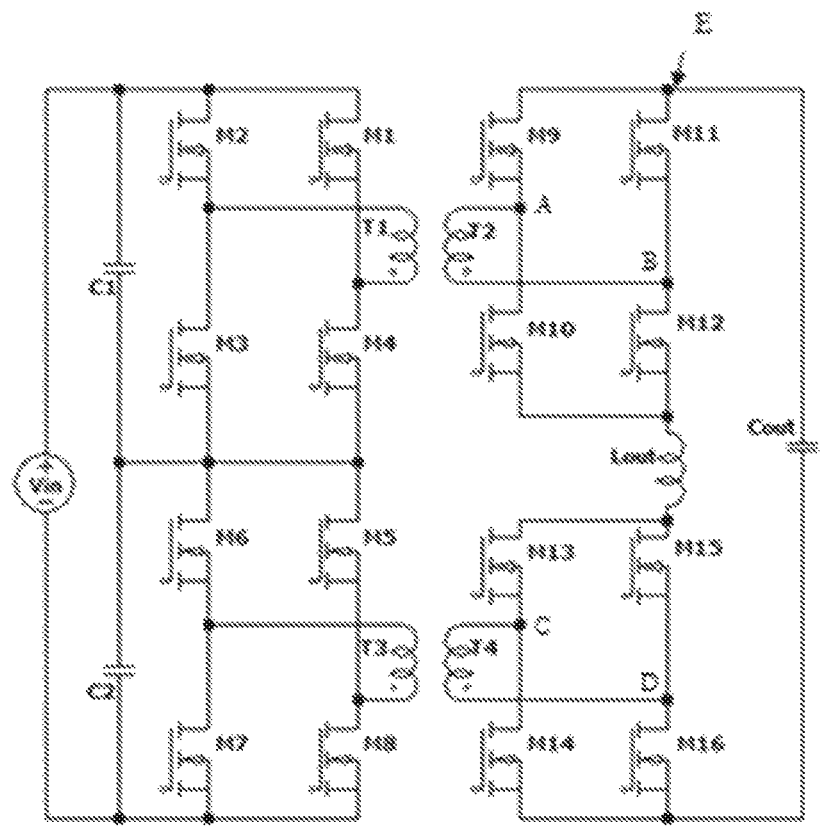
FIG. 7 is a schematic diagram according to a third embodiment of the disclosure.

FIG. 7 is a schematic diagram according to a third embodiment of the present disclosure.

Figure 8:
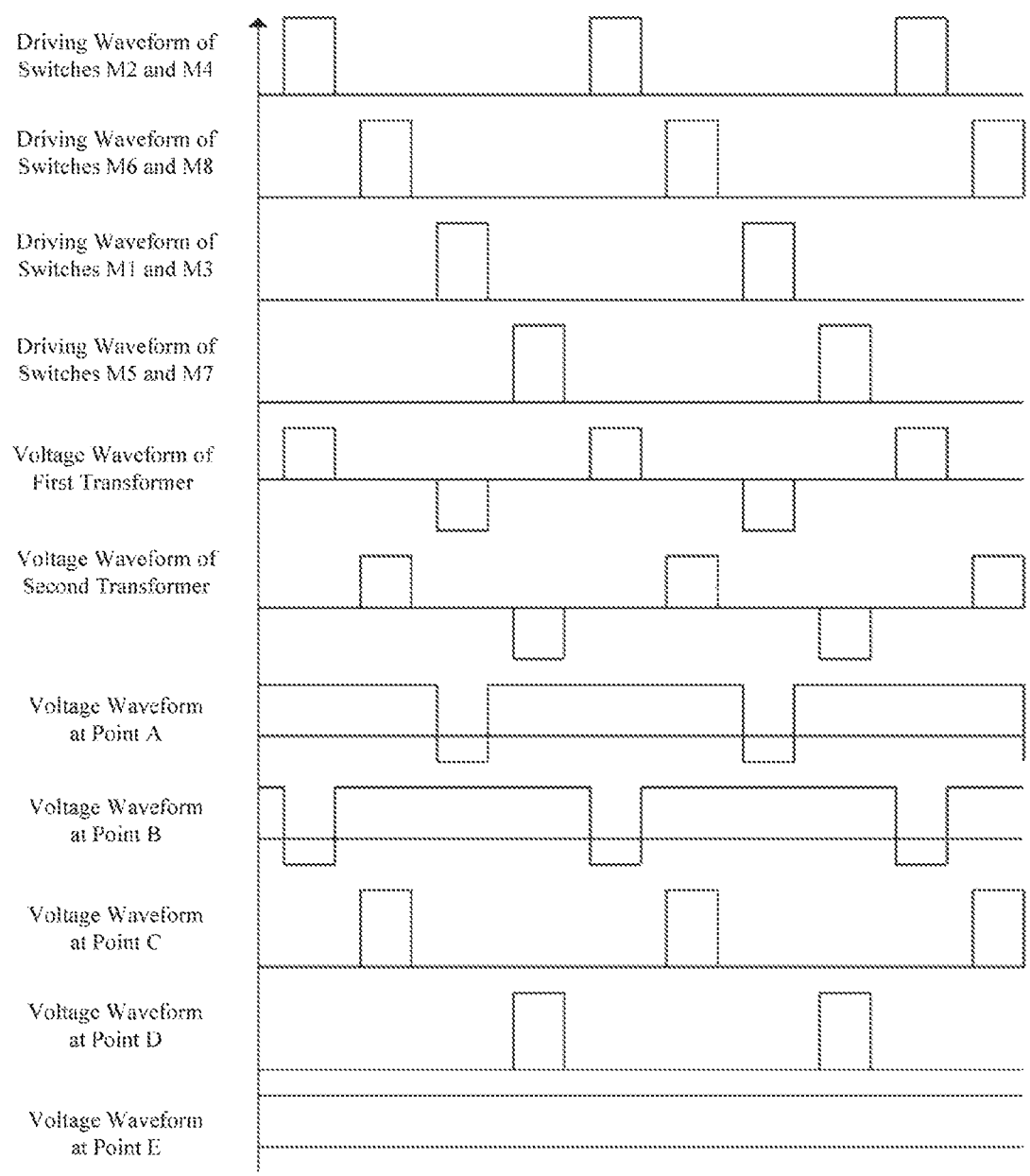
FIG. 8 illustrates a schematic control timing diagram of the embodiment shown in FIG. 7 (D<0.25).

FIG. 8 illustrates a control timing chart of the embodiment shown in FIG. 7 (D<0.25).

Referring to FIG. 7, the difference from FIG. 4 lies in that the output ends of the secondary side circuits of the branches in FIG. 4 are directly connected in series, while the secondary side circuits of the branches in FIG. 7 are connected in series through an inductor. The control manner of switches and the corresponding waveform are shown in FIG. 8.

Referring to FIG. 8, still taking the duty ratio D<0.25 as an example, in the first branch, the driving signals of the switches M2 and M4 have the same phase, the driving signals of the switches M1 and M3 have the same phase, and the phase difference between the driving signals of the switches M1 and M2 is 180 deg. In the second branch, the driving signals of switches M6 and M8 have the same phase, the driving signals of the switches M5 and M7 have the same phase, the phase difference between the driving signals of the switches M5 and M6 is 180 deg, and the phase difference between the driving signals of the switches M2 and M6 is 90 deg.

At this time, the voltage waveform at point E is approximate to the DC voltage waveform, so the size of the output filter circuit can be further reduced. As shown in FIG. 7, the output filter circuit may be a capacitor filter circuit, but the present disclosure is not limited thereto, and it may also be an inductor-capacitor filter circuit. In the embodiment shown in FIG. 7, the output ends of the secondary side circuit are connected in series through an inductor, the voltage across the inductor is zero or relatively small, the ripple of current flowing through the inductor winding is small, and the ripple of current flowing through the primary and secondary windings of each transformer is small. Accordingly, the conduction loss of the components and the copper loss of the transformer can be reduced; the ripple current is small, the high-frequency part is small, the skin effect is weak, and the copper loss of the conduction current conductor in the system can be reduced. Due to the small ripple current, the turn-off loss of the primary side switches can be effectively reduced, the size of the output filter circuit can be decreased, enabling the system to have better EMI characteristics.

Figure 9:
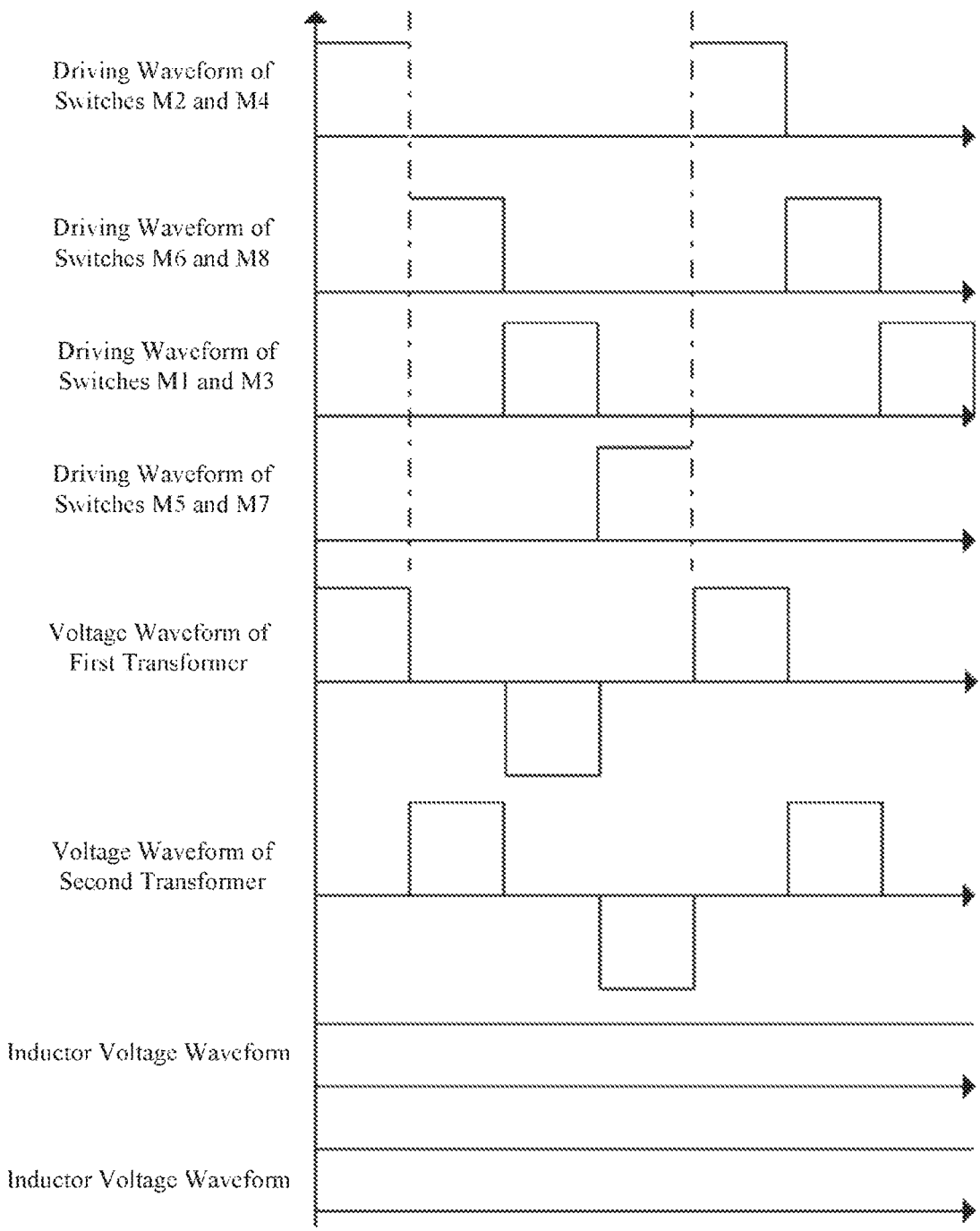
FIG. 9 illustrates a schematic control timing diagram of the embodiment shown in FIG. 7 (D=0.25).

FIG. 9 illustrates a control timing chart of the embodiment shown in FIG. 7 (D=0.25).

In this embodiment, when the duty ratio D=0.25, the amplitude and period of the coupling voltage across the secondary windings of the transformers at each branch are the same, and the voltages of the secondary windings of two sets of transformers are complementary, so that the voltage across the filter inductor is zero. Therefore, zero-ripple current flows through the primary and secondary windings of each transformer, which does not contain high-frequency part, has a weak skin effect and zero AC loss and, thus, can greatly reduce the conduction loss of components, the turn-off loss of the primary side switches and the copper loss of the transformer. On the other hand, due to the zero-ripple current, the inductor may be removed in the circuit design, and the ripple during the dead zone can be controlled and filtered out by using only the stray inductance and relatively small input and output capacitance in the line. In some other embodiments, when the duty ratio D=0.5 in the embodiment shown in FIG. 7, the above rule also exists, and details are not described herein.

Figure 10A:
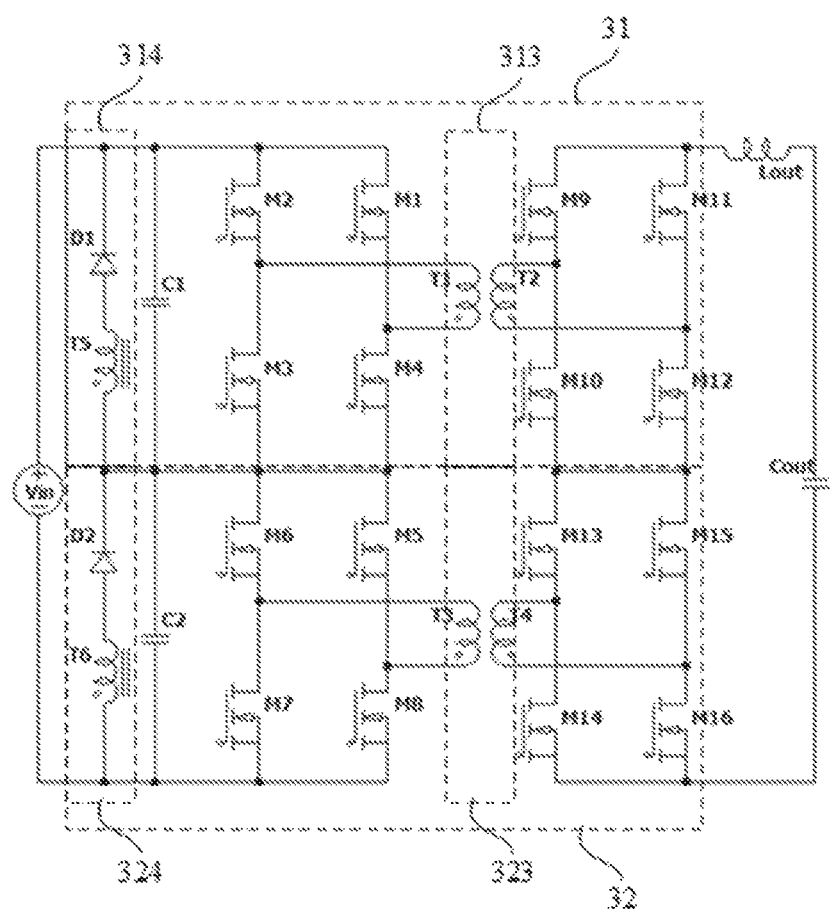
FIG. 10A and FIG. 10B are schematic diagrams according to a fourth embodiment of the disclosure.
Figure 10B:
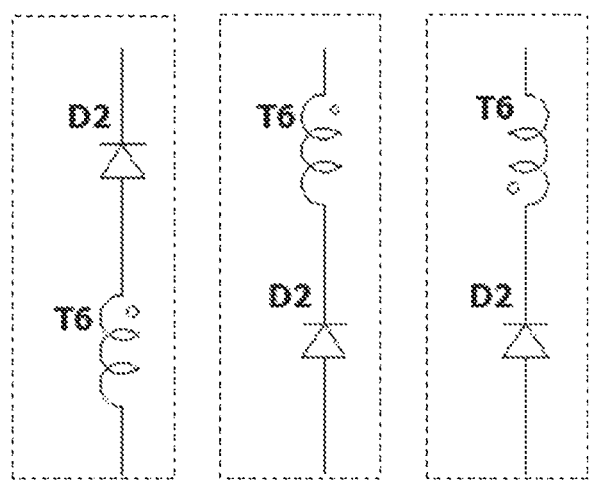

FIG. 10A and FIG. 10B are schematic diagrams according to a fourth embodiment of the disclosure.

In the embodiment shown in FIG. 10A, the primary side circuit of each branch is a full-bridge circuit, and each input capacitor is connected in parallel with a voltage equalizer circuit. Each voltage equalizer circuit includes a voltage equalizer winding that is magnetically coupled to the transformers in other branches and a diode coupled between the voltage equalizer winding and the input capacitor.

Taking the two-branch circuit as an example, the first branch 31 further includes a first voltage equalizer circuit 314, and the first voltage equalizer circuit 314 includes:

a voltage equalizer winding T5, magnetically coupled with the transformer 323 in the second voltage equalizer circuit 32; and a diode D1, coupled between the voltage equalizer winding T5 and the input capacitor C1.

The second branch 32 further includes a second voltage equalizer circuit 324, and the second voltage equalizer circuit 324 includes:

a voltage equalizer winding T6, magnetically coupled with the transformer 313 in the first voltage equalizer branch 31; and a diode D2, coupled between the voltage equalizer winding T6 and the input capacitor C2.

As shown in FIG. 10A, the first voltage equalizer circuit 314 charges the input capacitor C1 when the diode D1 is conducted in the forward direction, and always keeps the high potential point of the input capacitor C1 connected to the high potential point of the first voltage equalizer circuit. Similarly, the second voltage equalizer circuit 324 charges the input capacitor C2 when the diode D2 is conducted in the forward direction, and always keeps the high potential point of the input capacitor C2 connected to the high potential point of the second voltage equalizer branch. In addition, the diodes and windings of the voltage equalizer circuits may also be connected in other ways. As shown in FIG. 10B, all three types of voltage equalizer circuits may be used, as long as the high potential point of the voltage equalizer circuit is connected to the high potential end of its corresponding input capacitor. Those skilled in the art may set the connection mode for each voltage equalizer circuit according to the actual situation.

Figure 11:
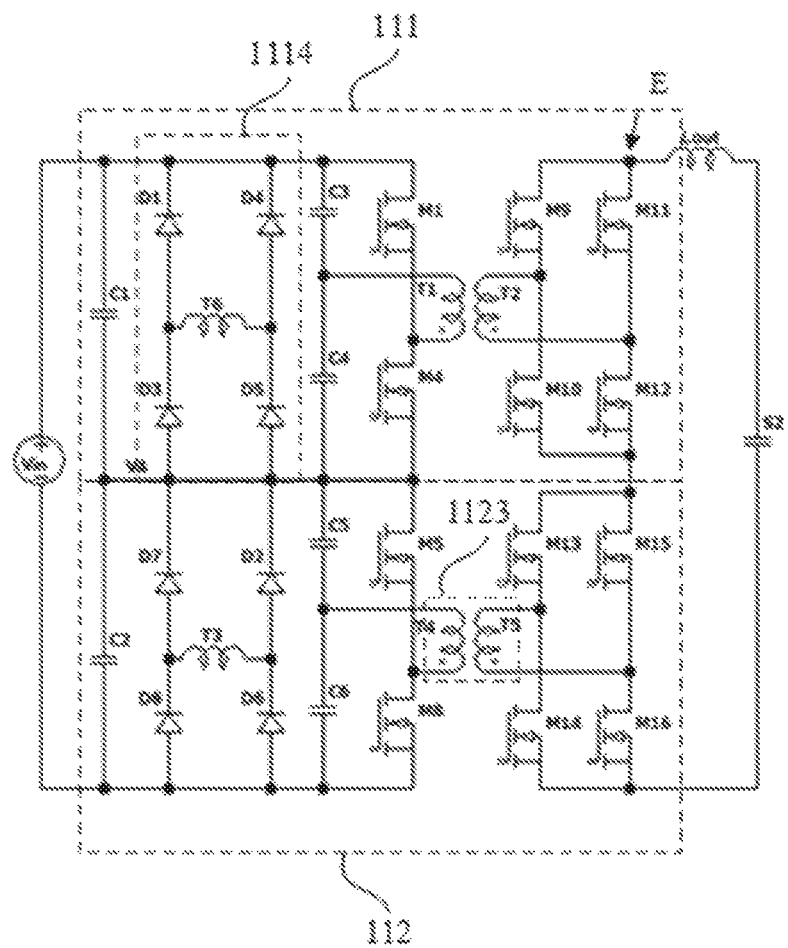
FIG. 11 is a schematic diagram according to a fifth embodiment of the disclosure.

FIG. 11 is a schematic diagram according to a fifth embodiment of the present disclosure. The technical solution of the present disclosure may be applied not only to a full-bridge circuit topology, but also to a half-bridge circuit topology. As shown in FIG. 11, the primary side circuit of the switch conversion branch is a half-bridge switch conversion circuit.

Similar to the control method of the switch in FIG. 4, in the topology shown in FIG. 11, the control method of the switches is as follows. The phase difference between the driving signals of the switches M1 and M4 is 180 deg, the phase difference between the driving signals of the switches M5 and M8 is 180 deg, and the phase difference between the driving signals of the switches M1 and M5 is 90 deg.

In still other embodiments of the present disclosure, the DC/DC conversion system may further include S switch conversion branches, where S is an integer greater than or equal to 2. In any two adjacent primary side circuits, that is, in any two adjacent half-bridge switch converter circuits, the phase difference between the driving signals of the switches at the corresponding positions is 180 deg/S. Moreover, when each secondary side circuit is connected in series through an inductor and the duty ratio of the driving signal is 1/S or 1/(2S), the output current ripple at the system output end is zero. At this time, the voltage waveform at point E is approximate to a DC voltage waveform. In this way, the size of the output filter circuit may be further reduced, and it can be a capacitor filter circuit. However, the present disclosure is not limited thereto, and an inductor-capacitor filter circuit may also be used.

Further, in FIG. 11, the primary side circuit of each branch is provided with a voltage equalizer circuit. The primary side circuit of the first branch 111 includes two capacitors C3 and C4 connected in series. The capacitors C3 and C4 may also cause voltage imbalance due to the effects of the input capacitance C1 of the first branch 111, the junction capacitance of the switches, the on-time difference of the switches, the leakage inductance of the transformer, the line parasitic resistance and the like. The voltage equalizer winding T6 of the first branch 111 is coupled to the transformer 1123 of the second branch 112 and forms a bridge rectifier circuit with four diodes D1, D3, D4, and D5. Serving as the first voltage equalizer circuit 1114 of the first branch 111, the rectifier circuit is connected in parallel across the input capacitor C1 of the first branch. When the diode is turned on, the high potential point of the first voltage equalizer circuit 1114 is connected with the high potential end of the input capacitor C1. The implementation of the second branch 112 is the same, and details are not described herein.

Figure 12:
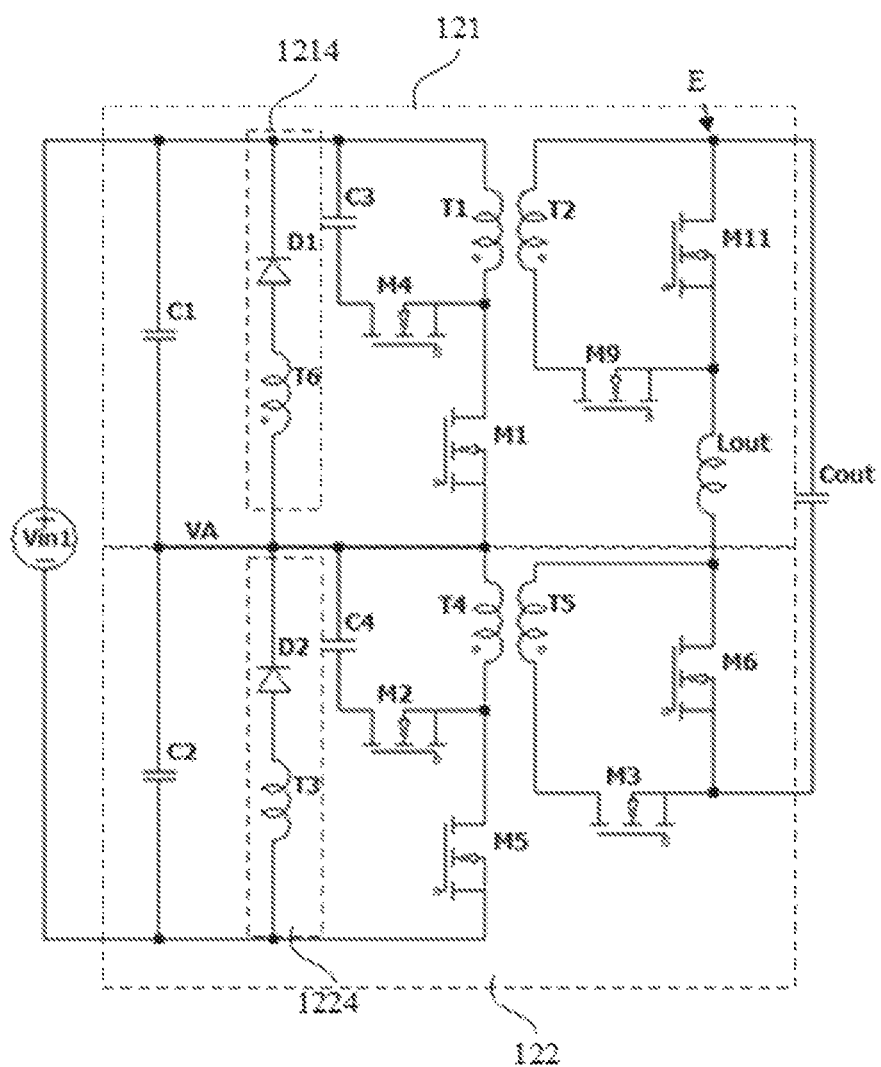
FIG. 12 is a schematic diagram according to a sixth embodiment of the disclosure.

FIG. 12 is a schematic diagram according to a sixth embodiment of the present disclosure. The technical solution of the present disclosure may also be applied to a forward circuit. As shown in FIG. 12, the switch conversion branch is a forward circuit.

In the topology shown in FIG. 12, the switches are controlled in such a manner that the driving signals of the main switch M1 and the clamping switch M4 are complementary, the driving signals of the main switch M5 and the clamping switch M2 are complementary, and the drive signals of the main switch M1 and the main switch M5 have a phase difference of 180 deg.

In other embodiments of the present disclosure, when the DC/DC conversion system includes S forward conversion branches, and S is an integer greater than or equal to 2, in any two adjacent primary side circuits, the drive signals of the switches at corresponding positions have a phase difference of 360 deg/S. In the embodiment shown in FIG. 12, S=2, and the phase difference between the driving signals of the switches at the corresponding positions is 360 deg/2, that is, 180 deg. Moreover, when each secondary side circuit is connected in series through an inductor and the duty ratio of the driving signal is 1/S, the output current ripple at the system output end is zero. At this time, the voltage waveform at point E is approximate to a DC voltage waveform. In this way, the size of the output filter circuit may be further reduced, and it can be a capacitor filter circuit. However, the present disclosure is not limited thereto, and an inductor-capacitor filter circuit may also be used.

Furthermore, in FIG. 12, the primary side circuit of the first branch 121 is provided with a first voltage equalizer circuit 1214, and the primary side circuit of the second branch 122 includes a second voltage equalizer circuit 1224, which will not be repeated herein.

Figure 13:
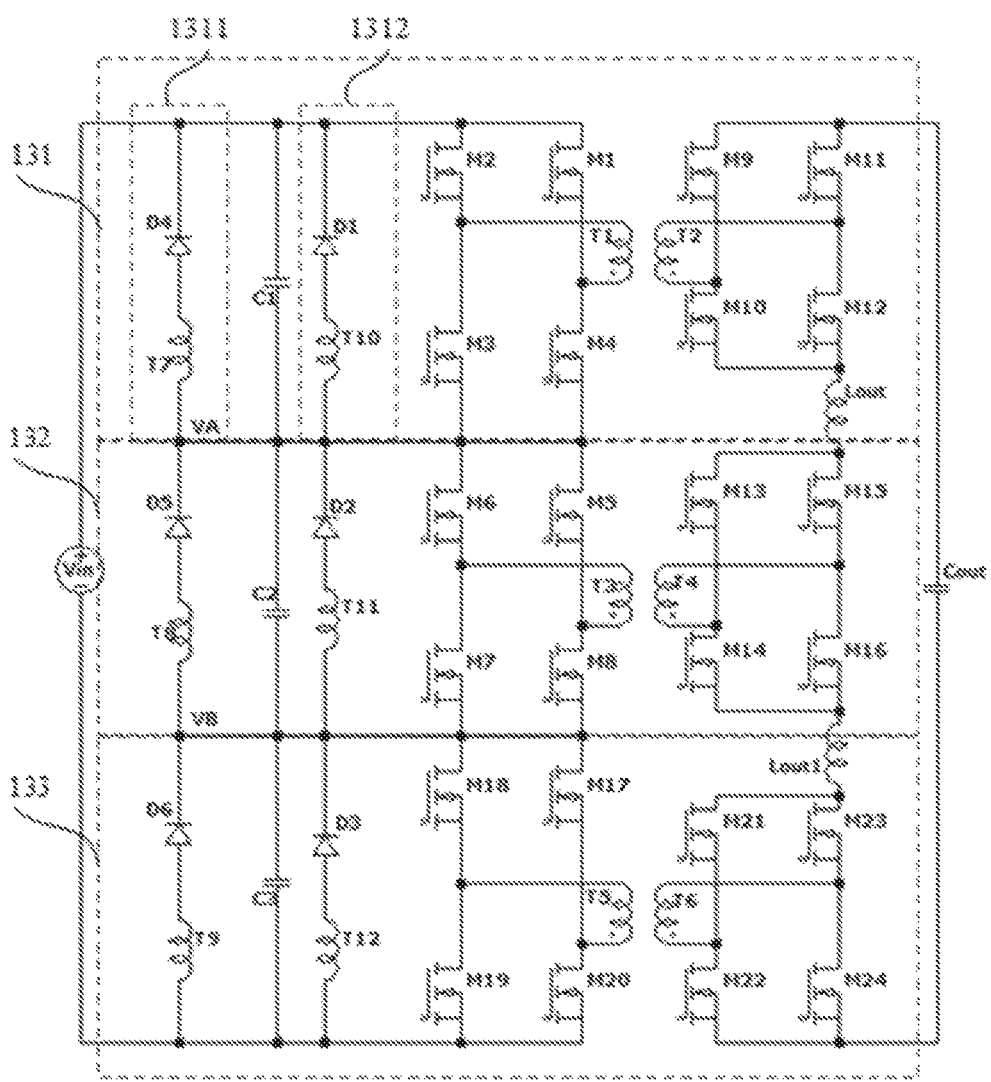
FIG. 13 is a schematic diagram according to a seventh embodiment of the disclosure.

FIG. 13 is a schematic diagram according to a seventh embodiment of the present disclosure. As shown in FIG. 13, three full-bridge switch conversion branches 131, 132 and 133 are connected in series at both the primary side and the secondary side.

The same parts as in FIG. 4 are not repeated, but the difference therefrom lies in that the phase difference between the driving signals of the switches at the corresponding positions of any two adjacent primary side circuits is 60 degrees.

In some other embodiments of the present disclosure, when the DC/DC conversion system includes S full-bridge switch conversion branches, and S is an integer greater than or equal to 2, in any two adjacent primary side circuits, the drive signals of the switches at corresponding positions have a phase difference of 180 deg/S. In the embodiment shown in FIG. 13, S=3, and the phase difference between the driving signals of the switches at the corresponding positions is 180 deg/3, that is, 60 deg. At this time, when each secondary side circuit is connected in series through an inductor and the duty ratio of the driving signal is 1/S or 1/(2S), the output current ripple at the system output end is zero, and the voltage waveform at point E is approximate to a DC voltage waveform. In this way, the size of the output filter circuit may be further reduced, and it can be a capacitor filter circuit. However, the present disclosure is not limited thereto, and an inductor-capacitor filter circuit may also be used.

In the topology shown in FIG. 13, each branch is provided with multiple voltage equalizer circuits to achieve voltage equalization. In the first branch circuit 131, a voltage equalization module is formed by two voltage equalizer circuits 1311 and 1312. In an embodiment, a voltage equalizer winding T7 of the first voltage equalizer circuit 1311 is coupled to the transformer T3/T4 of the second branch 132, and a voltage equalizer winding T10 of the second voltage equalizer circuit 1312 is coupled to the transformer T5/T6 of the third branch. The two voltage equalizer circuits are connected in parallel to form a voltage equalizer module, and are connected in parallel across the input capacitor C1 of the first branch 131. The configuration of the number of voltage equalizer circuits in this voltage equalizer module is to ensure that the transformers of other branches are coupled. Therefore, in a circuit composed of S branches, each branch may be provided with (S−1) number of voltage equalizer circuits, and the windings in the (S−1) number of voltage equalizer circuits are coupled to the transformer windings in all the other branches, so as to achieve the purpose of voltage equalization.

In some other embodiments of the present disclosure, the DC/DC conversion system further includes a voltage equalization control module configured to compare a voltage of each input capacitor with a reference input voltage to obtain a corresponding first error signal respectively; compare an output voltage of the DC/DC conversion system with a reference output voltage to obtain a second error signal; and adjust a duty ratio of a switch of the primary side circuit correspondingly according to the first error signal and the second error signal.

Figure 14A:
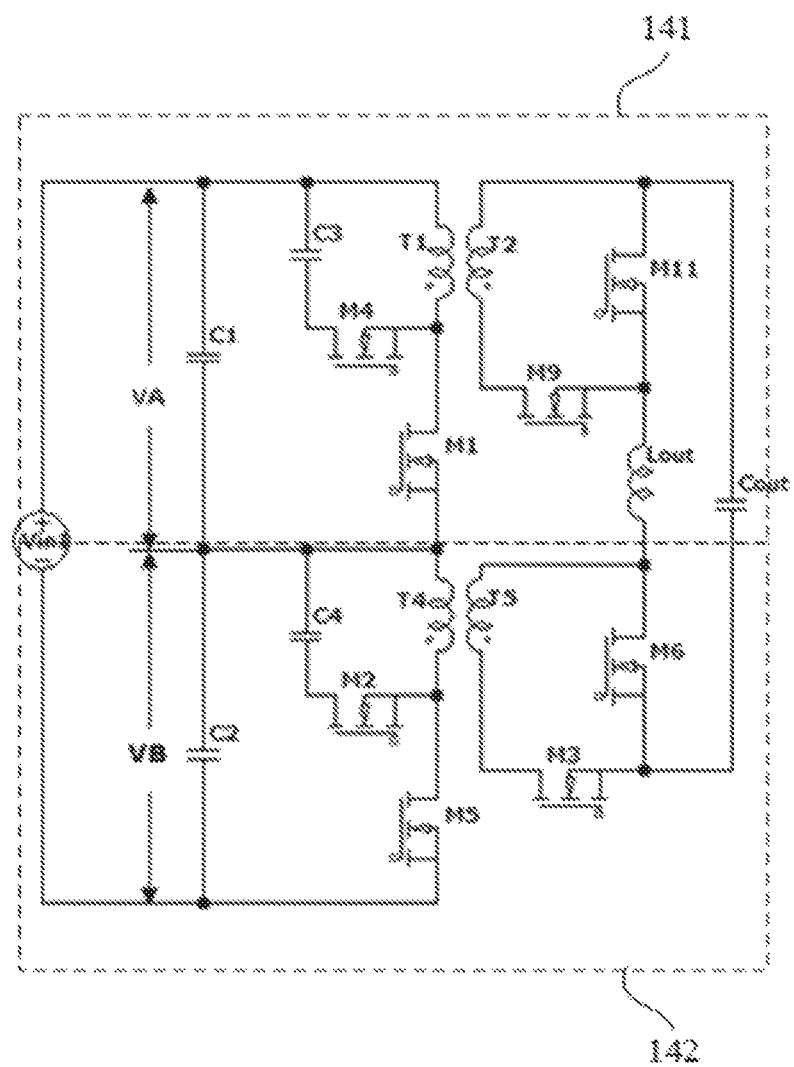
FIGS. 14A-14C are schematic diagrams according to an eighth embodiment of the disclosure.
Figure 14B:
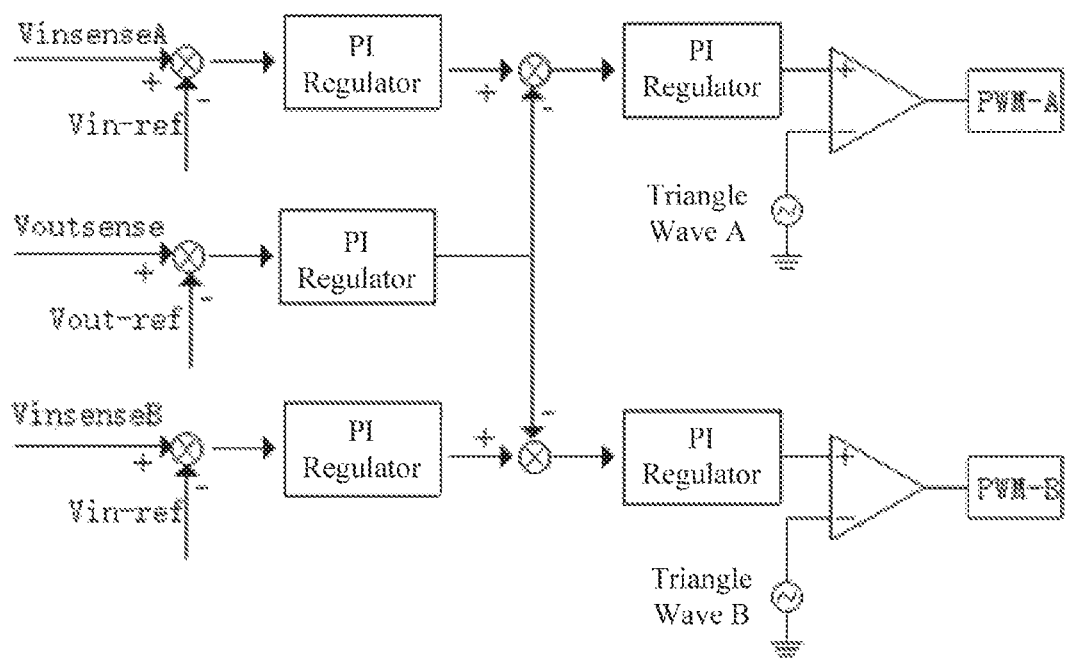
Figure 14C:
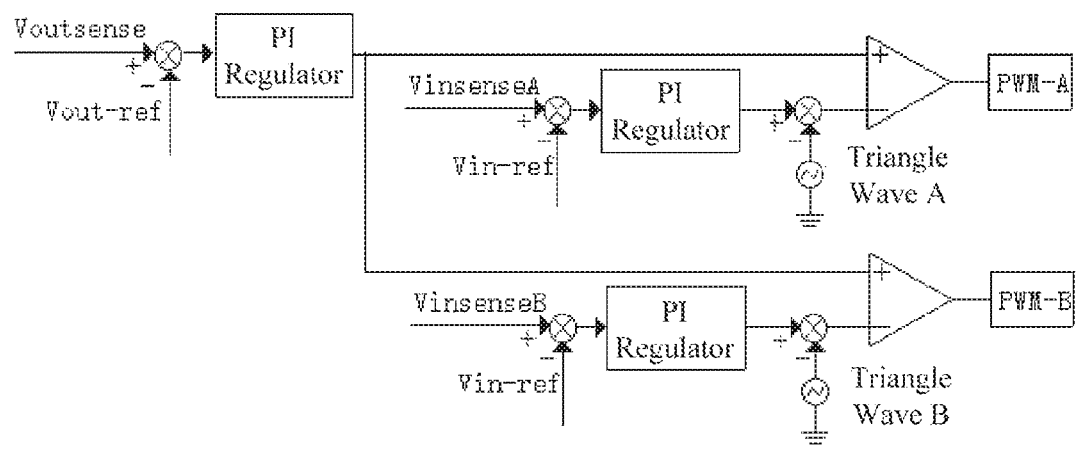

FIGS. 14A-14C are schematic diagrams according to an eighth embodiment of the disclosure. FIGS. 14A-14C exemplarily illustrate a technical solution for achieving voltage equalization of each branch through a voltage equalization control module.

Referring to FIG. 14A, taking two branches of forward circuits connected in series as an example, the voltage VA across the input capacitor C1 of the first branch 141 is sampled as VinsenseA, the voltage VB across the input capacitor C2 of the second branch 142 is sampled as VinsenseB, and the voltage across the output capacitor Cout is sampled as Voutsense.

Referring to FIG. 14B, as a voltage equalization control module, the voltages VinsenseA and VinsenseB of the input capacitors may be firstly compared with the reference input voltage Vin-ref to obtain corresponding first error signals, respectively. The output voltage Voutsense is compared with the reference output voltage Vout-ref to obtain a second error signal. The first error signal and the second error signal are respectively proportionally is integrated to obtain a first adjustment signal and a second adjustment signal, and the first adjustment signal is compared with the second adjustment signal to obtain a third error signal. Then a proportional integral operation is performed on the third error signal to obtain a third adjustment signal, which is compared with a corresponding carrier signal to obtain a comparison result. The duty ratio of drive signals of the switches in the primary side circuit, which are connected in parallel with the input capacitors, may be adjusted correspondingly based on the corresponding comparison result. Taking the forward circuits connected in series shown in FIG. 14A as an example, in the voltage equalization control module shown in FIG. 14B, the carrier signals, namely the triangular wave A and the triangular wave B, have a phase difference of 180 deg, the switch signal PWM-A, after being amplified by a driver, is used to drive the main switch M1 of the first branch 141, and the switch signal PWM-B, after being amplified by a driver, is used to drive the main switch M5 of the second branch 142.

Referring to FIG. 14C, in another voltage equalization control module, the input voltages VinsenseA and VinsenseB may be firstly compared with the reference input voltage Vin-ref, respectively, to obtain corresponding first error signals. The output voltage Voutsense is compared with the reference output voltage Vout-ref to obtain a second error signal. The first error signal and the second error signal as obtained are respectively proportionally integrated to obtain a first adjustment signal and a second adjustment signal. The first adjustment signal is superimposed with a corresponding carrier signal to obtain a third adjustment signal, which is then compared with the second adjustment signal to obtain a comparison result. The duty ratio of drive signals of the switches in the primary side circuit, which are connected in parallel with the input capacitors, may be adjusted correspondingly based on the corresponding comparison result. Taking the forward circuits connected in series shown in FIG. 14A as an example, in the voltage equalization control module shown in FIG. 14C, the triangular wave A and the triangular wave B have a phase difference of 180 deg, the is switch signal PWM-A, after being amplified by a driver, is used to drive the main switch M1 of the first branch 141, and the switch signal PWM-B, after being amplified by a driver, is used to drive the main switch M5 of the second branch 142.

FIG. 14B and FIG. 14C are only exemplary embodiments of the voltage equalization control module. Based on the above solutions, those skilled in the art may also use other voltage equalization control modules to implement voltage equalization for each branch of the DC/DC conversion system, the present disclosure is not limited thereto.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the claims.

What is claimed is:

1. A DC/DC conversion system, comprising:
 a plurality of switch conversion branches, each of the switch conversion branches comprises:
 a primary side circuit, having an input end connected in parallel with an input capacitor;
 a transformer, having a primary winding coupled to the primary side circuit; and
 a secondary side circuit, coupled to a secondary winding of the transformer,
 wherein, input ends of the primary side circuits of the plurality of switch conversion branches are connected in series to form a system input end, output ends of the secondary side circuits of the plurality of switch conversion branches are connected in series to form a system output end, and a filter circuit is connected in parallel with the system output end,
 each of the switch conversion branches comprises a voltage equalizer circuit connected in parallel with the input capacitor, and
 the voltage equalizer circuit comprises:
 a voltage equalizer winding, magnetically coupled with the transformer in another switch conversion branch; and
 a diode, coupled between the voltage equalizer winding and the input capacitor.

2. The DC/DC conversion system according to claim 1, wherein the primary side circuit comprises a full-bridge circuit or a half-bridge circuit.

3. The DC/DC conversion system according to claim 2, wherein in any two adjacent primary side circuits, a phase difference between driving signals of switches at corresponding positions is 180 deg/S, and S is a number of the plurality of switch conversion branches.

4. The DC/DC conversion system according to claim 3, wherein duty ratios of the driving signals of the switches of the primary side circuits are same, and a range of the duty ratio is 5%-50%.

5. The DC/DC conversion system according to claim 4, wherein the duty ratio is 1/S or 1/(2S).

6. The DC/DC conversion system according to claim 1, wherein the secondary side circuit comprises a full-bridge circuit formed by a diode bridge arm.

7. The DC/DC conversion system according to claim 1, wherein each of the switch conversion branches comprises a forward circuit.

8. The DC/DC conversion system according to claim 7, wherein in any two adjacent primary side circuits, a phase difference between driving signals of main switches at corresponding positions is 360 deg/S, and S is a number of the plurality of switch conversion branches.

9. The DC/DC conversion system according to claim 8, wherein duty ratios of the driving signals of the switches of the primary side circuits are same, and a range of the duty ratio is 5%-95%.

10. The DC/DC conversion system according to claim 9, wherein the duty ratio is 1/S.

11. The DC/DC conversion system according to claim 1, wherein output ends of two switch conversion branches or any two adjacent switch conversion branches are directly connected in series.

12. The DC/DC conversion system according to claim 1, wherein output ends of two switch conversion branches or any two adjacent switch conversion branches are connected in series through an inductor.

13. The DC/DC conversion system according to claim 1, wherein the filter circuit comprises only a capacitor.

14. The DC/DC conversion system according to claim 1, wherein the filter circuit comprises an inductor and a capacitor.

15. A DC/DC conversion system, comprising:
a plurality of switch conversion branches, each of the switch conversion branches comprises:
a primary side circuit, having an input end connected in parallel with an input capacitor;
a transformer, having a primary winding coupled to the primary side circuit; and
a secondary side circuit, coupled to a secondary winding of the transformer,
wherein, input ends of the primary side circuits of the plurality of switch conversion branches are connected in series to form a system input end, output ends of the secondary side circuits of the plurality of switch conversion branches are connected in series to form a system output end, and a filter circuit is connected in parallel with the system output end, and
DC/DC conversion system, further comprises a voltage equalization control module, wherein the voltage equalization control module is configured to:
compare a voltage of each input capacitor with a reference input voltage to obtain a corresponding first error signal;
compare an output voltage of the DC/DC conversion system with a reference output voltage to obtain a second error signal; and
adjust a duty ratio of a driving signal of a switch of the primary side circuit according to the corresponding first error signal and the second error signal.

16. The DC/DC conversion system according to claim 15, wherein the voltage equalization control module is further configured to:
perform a proportional integral operation on the first error signal to obtain a first adjustment signal;
perform a proportional integral operation on the second error signal to obtain a second adjustment signal;
compare the first adjustment signal with the second adjustment signal to obtain a third error signal;
perform a proportional integral operation on the third error signal to obtain a third adjustment signal; and
compare the third adjustment signal with a corresponding carrier signal to obtain a comparison result, and adjust the duty ratio of the driving signal of the switch of the primary side circuit according to the corresponding comparison result.

17. The DC/DC conversion system according to claim 15, wherein the voltage equalization control module is further configured to:
perform a proportional integral operation on the first error signal to obtain a first adjustment signal;
perform a proportional integral operation on the second error signal to obtain a second adjustment signal;
add the first adjustment signal with a corresponding carrier signal to obtain a third adjustment signal; and
compare the third adjustment signal with the second adjustment signal to obtain a comparison result, and adjust the duty ratio of the driving signal of the switch of the primary side circuit according to the corresponding comparison result.

* * * * *